US012634168B2

(12) United States Patent
Kalhan et al.

(10) Patent No.: US 12,634,168 B2
(45) Date of Patent: May 19, 2026

(54) METHODS, APPARATUSES AND SYSTEMS FOR USER EQUIPMENT CHANNEL ESTIMATION

(71) Applicant: KYOCERA CORPORATION, Kyoto (JP)

(72) Inventors: Amit Kalhan, San Diego, CA (US); Henry Chang, San Diego, CA (US)

(73) Assignee: KYOCERA CORPORATION, Kyoto (JP)

( * ) Notice: Subject to any disclaimer, the term of this patent is extended or adjusted under 35 U.S.C. 154(b) by 21 days.

(21) Appl. No.: 18/854,939

(22) PCT Filed: Apr. 11, 2023

(86) PCT No.: PCT/US2023/018170
§ 371 (c)(1),
(2) Date: Oct. 7, 2024

(87) PCT Pub. No.: WO2023/200789
PCT Pub. Date: Oct. 19, 2023

(65) Prior Publication Data
US 2025/0254065 A1 Aug. 7, 2025

Related U.S. Application Data

(60) Provisional application No. 63/330,901, filed on Apr. 14, 2022.

(51) Int. Cl.
*H04L 25/02* (2006.01)
*H04L 5/00* (2006.01)

(52) U.S. Cl.
CPC ........ *H04L 25/0202* (2013.01); *H04L 5/0069* (2013.01)

(58) Field of Classification Search
CPC .............. H04L 25/0202; H04L 5/0069; H04L 25/0254; H04L 5/0051
See application file for complete search history.

(56) References Cited

U.S. PATENT DOCUMENTS

| 10,045,352 B2 * | 8/2018 | Yue ...................... H04B 7/0617 |
| 2004/0192218 A1 * | 9/2004 | Oprea ............... H04L 25/03343 |
| | | 455/73 |

(Continued)

*Primary Examiner* — Chieh M Fan
(74) *Attorney, Agent, or Firm* — Duane Morris LLP

(57) ABSTRACT

Methods, apparatuses and systems for user equipment channel estimation, in accordance with some embodiments, includes: accessing a database storing a first plurality of locations, a first plurality of channels associated with respective ones of the first plurality of locations, and a first plurality of channel estimates associated with respective ones of the first plurality of channels; obtaining a second location of a first wireless communication device; determining a closest location from among the first plurality locations that has a closest distance to the second location; selecting a channel estimate from among the first plurality of channel estimates that corresponds to the closest location; determining a second channel estimate for the first wireless communication device based on the selected channel estimate; and adjusting at least one parameter of a signal transmitted between the first wireless communication node and the first wireless communication device based on the second channel estimate.

21 Claims, 10 Drawing Sheets

(56)                    References Cited

U.S. PATENT DOCUMENTS

| | | | |
|---|---|---|---|
| 2006/0045194 A1* | 3/2006 | Athanasios | H04L 25/0212 |
| | | | 375/346 |
| 2006/0128326 A1* | 6/2006 | Pietraski | H04L 25/0228 |
| | | | 455/130 |
| 2015/0237513 A1* | 8/2015 | Garrett | H04L 25/0222 |
| | | | 370/252 |
| 2021/0159993 A1* | 5/2021 | Studer | H04B 17/364 |
| 2022/0201517 A1* | 6/2022 | Ginthoer | H04W 36/00837 |
| 2025/0219690 A1* | 7/2025 | Jung | H04B 7/0404 |

* cited by examiner

METHODS, APPARATUSES AND SYSTEMS FOR USER EQUIPMENT CHANNEL ESTIMATION

RELATED APPLICATIONS

This application is a U.S. National Stage Application of International Application No. PCT/US2023/018170 filed Apr. 11, 2023, which claims priority to U.S. Provisional Application No. 63/330,901, entitled "Machine Learning Positioning MIMO Transmissions," filed on Apr. 14, 2022, the entireties of which are incorporated by reference herein.

TECHNICAL FIELD

The disclosure relates generally to wireless communications and, more particularly, to methods, apparatuses and systems for user equipment channel estimation.

BACKGROUND

In a wireless communication system, signals are transmitted through a transmission medium (also called a channel) in which the signals may get distorted due to various types of noise and/or interference. To properly decode the received signals, the characteristics of the channel should be carefully characterized, and the technique/process to characterize the channel is called channel estimation. As one example, channel estimation can be performed by first setting a mathematical model to correlate "transmitted signals" to "received signals" using a channel matrix. Then a known signal (called a "reference signal" or a "pilot signal") can be transmitted by a transmitter and received by a receiver. By comparing the transmitted known signal at the transmitter and the received signal at the receiver, elements of the channel matrix can be estimated.

The scarcity of available frequency band for wireless communications has led to the inclusion of millimeter Wave (mmWave) frequencies in cellular communications. This has opened the doors for massive multiple-input multiple-output (MIMO) systems. Due to high transmission frequencies, fabrication of large number of antennas with a relatively small form factor has become possible. MmWave band has inherent hindrances such as high path-loss and absorption-loss. The large number of antennas in a massive MIMO system leads to the challenging issue of channel estimation in mmWave communications.

The overall performance of a wireless communication system is highly influenced by the accuracy with which the channel is estimated at the receiver node. It is important to design methods that can efficiently provide the channel estimates even in worst case channel scenarios. The designed channel estimation methods need to be robust and spectrally efficient, yet computationally efficient. In cases where the receiver is rapidly moving while signals are being received, conventional linear channel estimation techniques may be ineffective due to rapid channel variations. Therefore, in such cases, there is a need to develop new channel estimation techniques to efficiently track channel variations with low estimation overhead.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In some embodiments, a method performed by a first wireless communication node, includes: generating a database including a first plurality of locations and a first plurality of channel parameter vectors, wherein each of the first plurality of locations is associated with a corresponding one of the first plurality of channel parameter vectors, obtaining a second location of a first wireless communication device, when a minimum distance between the second location and each of the first plurality of locations is less than or equal to a predetermined distance threshold, estimating a second channel parameter vector for the first wireless communication device based on the first plurality of locations, the first plurality of channel parameter vectors, and the second location, and compensating distortions in a transmission between the first wireless communication node and the first wireless communication device based on the estimated second channel parameter vector.

In some embodiments, the method performed by the first wireless communication node further includes: updating the database by adding the second location to the first plurality of locations when the minimum distance between the second location and each of the first plurality of locations is larger than the predetermined distance threshold, broadcasting a channel estimation request for the first wireless communication device, receiving a sounding reference signal (SRS) from the first wireless communication device in response to the broadcasting, estimating the second channel parameter vector for the first wireless communication device based on the received SRS, and updating the database by adding the estimated second channel parameter vector to the first plurality of channel parameter vectors in the database.

In some embodiments, the predetermined distance threshold is determined based on a communication type between the first wireless communication node and the first wireless communication device, wherein the communication type is a line-of-sight (LOS) type or a non-line-of-sight (NLOS) type, wherein the predetermined distance threshold determined when the communication type is the LOS type is larger than the predetermined distance threshold determined when the communication type is the NLOS type.

In some embodiments, the second channel parameter vector is estimated to be equal to a third channel parameter vector from the first plurality of channel parameter vectors, wherein the third channel parameter vector is associated with a corresponding third location from the first plurality of locations, wherein a second distance between the second location and the third location is equal to the minimum distance between the second location and each of the first plurality of locations.

In some embodiments, the second channel parameter vector is estimated using a position-to-channel mapping function, wherein the position-to-channel mapping function is learned from the first plurality of locations and the first plurality of channel parameter vectors, wherein the position-to-channel mapping function is an artificial neural network model.

In some embodiments, each of the first plurality of locations is associated with a corresponding second plurality of channel parameter vectors, wherein each of the corresponding second plurality of channel parameter vectors is associated with a distinct mobility value of the first wireless communication device.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1A:
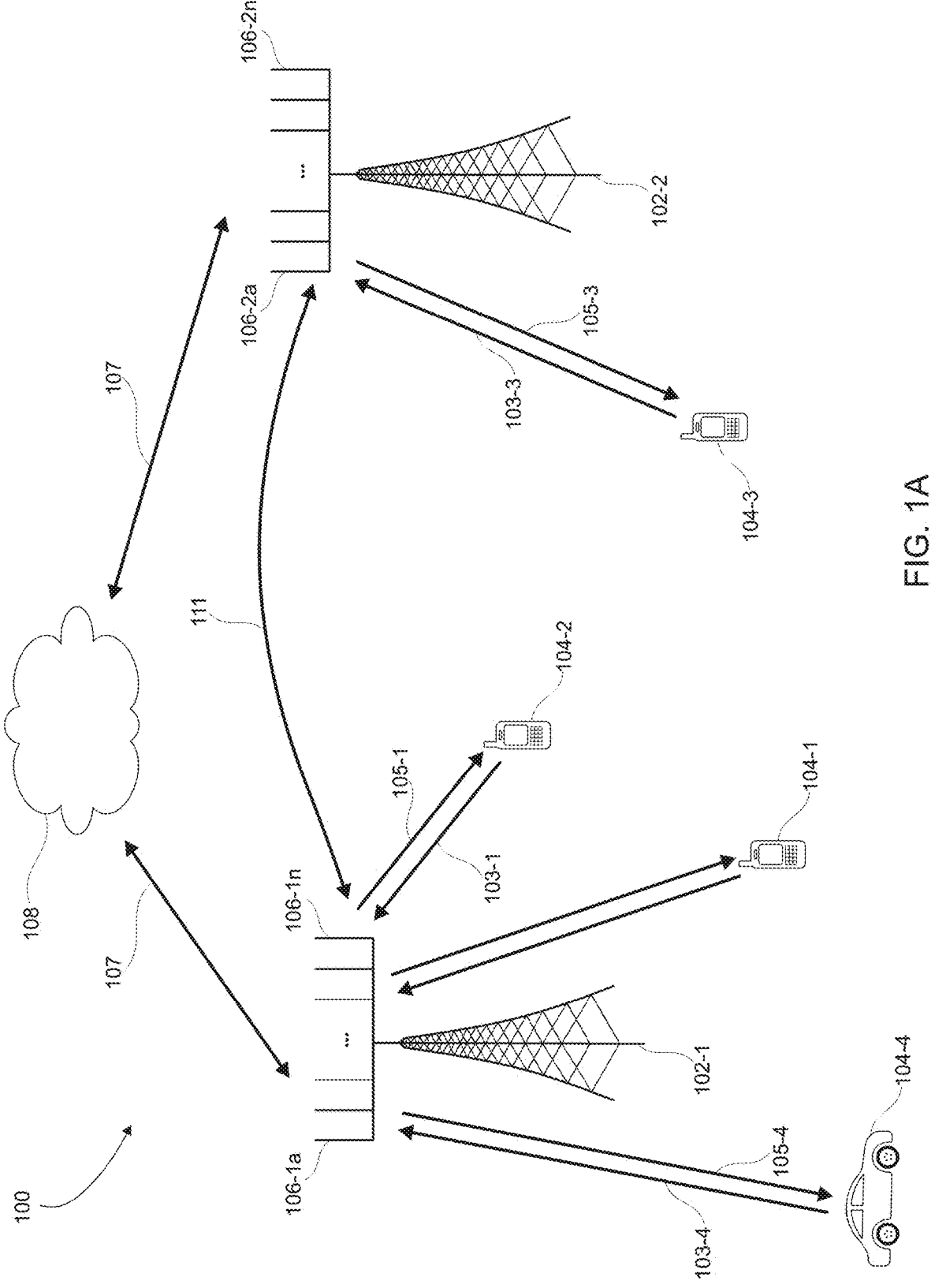
FIG. 1A illustrates an exemplary wireless communication network, in accordance with some embodiments of the present disclosure.

FIG. 1A illustrates an exemplary wireless communication network 100, in accordance with some embodiments of the present disclosure. In a wireless communication system, a network side communication node or a base station (BS) 102 can be a node B, an E-UTRA Node B (also known as Evolved Node B, eNodeB or eNB), a New Generation eNB (ng-eNB), a gNodeB (also known as gNB) in new radio (NR) technology, a pico station, a femto station, or the like. A terminal side communication device or a user equipment (UE) 104 can be a long range communication system like a mobile phone, a smart phone, a personal digital assistant (PDA), tablet, laptop computer, or a short range communication system such as, for example a wearable device, a vehicle with a vehicular communication system and the like. A network communication node and a terminal side communication device are represented by a BS 102 and a UE 104, respectively, and in all the embodiments in this disclosure hereafter, and are generally referred to as "communication nodes" and "communication device," respectively, herein. Such communication nodes and communication devices are capable of wireless communications, in accordance with various embodiments of the invention. It is noted that all the embodiments are merely preferred examples and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a first BS 102-1, a second BS 102-2, a first UE 104-1, a second UE 104-2, a third UE 104-3, and a fourth UE 104-4. In some embodiments, the first BS 102-1 and the second BS 102-2 comprise a first plurality of antennas 106-1$a$ to 106-1$n$ and a second plurality of antennas 106-2$a$ to 106-2$n$, respectively. The first plurality of antennas 106-1$a$ to 106-1$n$ may communicate with one or more of the plurality of UEs 104 to form a first MIMO system, and the second plurality of antennas 106-2$a$ to 106-2$n$ may communicate with one of more of the plurality of UEs 104 to form a second MIMO system.

In some embodiments, the plurality of UEs 104 may form direct communication links, such as uplink channels 103-1, 103-2, 103-3, and 103-4 and downlink channels 105-1, 105-2, 105-3, and 105-4 with the first BS 102-1 and/or the second BS 102-2. The direct communication channels between the plurality of UEs 104 and one or more of the BS's 102 can be through interfaces such as an Uu interface, which is also known as E-UTRAN air interface. In some embodiments, the UE 104 comprises a plurality of transceivers which enables the UE 104 to support multi connectivity so as to receive data simultaneously from the first BS 102-1 and the second BS 102-2. Each of the first BS 102-1 and the second BS 102-2 is connected to a core network (CN) 108 on a user plane (UP) through an external interface 107, e.g., an Iu interface, an NG-U interface, or an S1-U interface. In some embodiments, the CN 108 is one of the following: an Evolved Packet Core (EPC) and a 5G Core Network (5GC). In some embodiments, the CN 108 further comprises at least one of the following: Access and Mobility Management Function (AMF), User Plane Function (UPF), and System Management Function (SMF). In some embodiments, the CN 108 can provide cloud-computing functionality by providing one or more databases and/or servers for storing and processing data and/or instructions to perform machine learning processes, as described in further detail below.

A direct communication channel 111 between the first BS 102-1 and the second 102-2 is through an X2 interface. In some embodiments, a BS (e.g., a gNB) is split into a Distributed Unit (DU) and a Central Unit (CU) on the UP, between which the direct communication is through a F1-U interface. In some embodiments, a CU of the second BS 102-2 can be further split into a Control Plane (CP) and a User Plane (UP), between which the direct communication is through an E1 interface. Hereinafter in the present disclosure, an Xx interface is used to describe one of the following interfaces, the NG interface, the S1 interface, the X2 interface, the Xn interface, the F1 interface, and the E1 interface. When an Xx interface is established between two nodes, the two nodes can transmit control signaling on the CP and/or data on the UP.

Figure 1B:
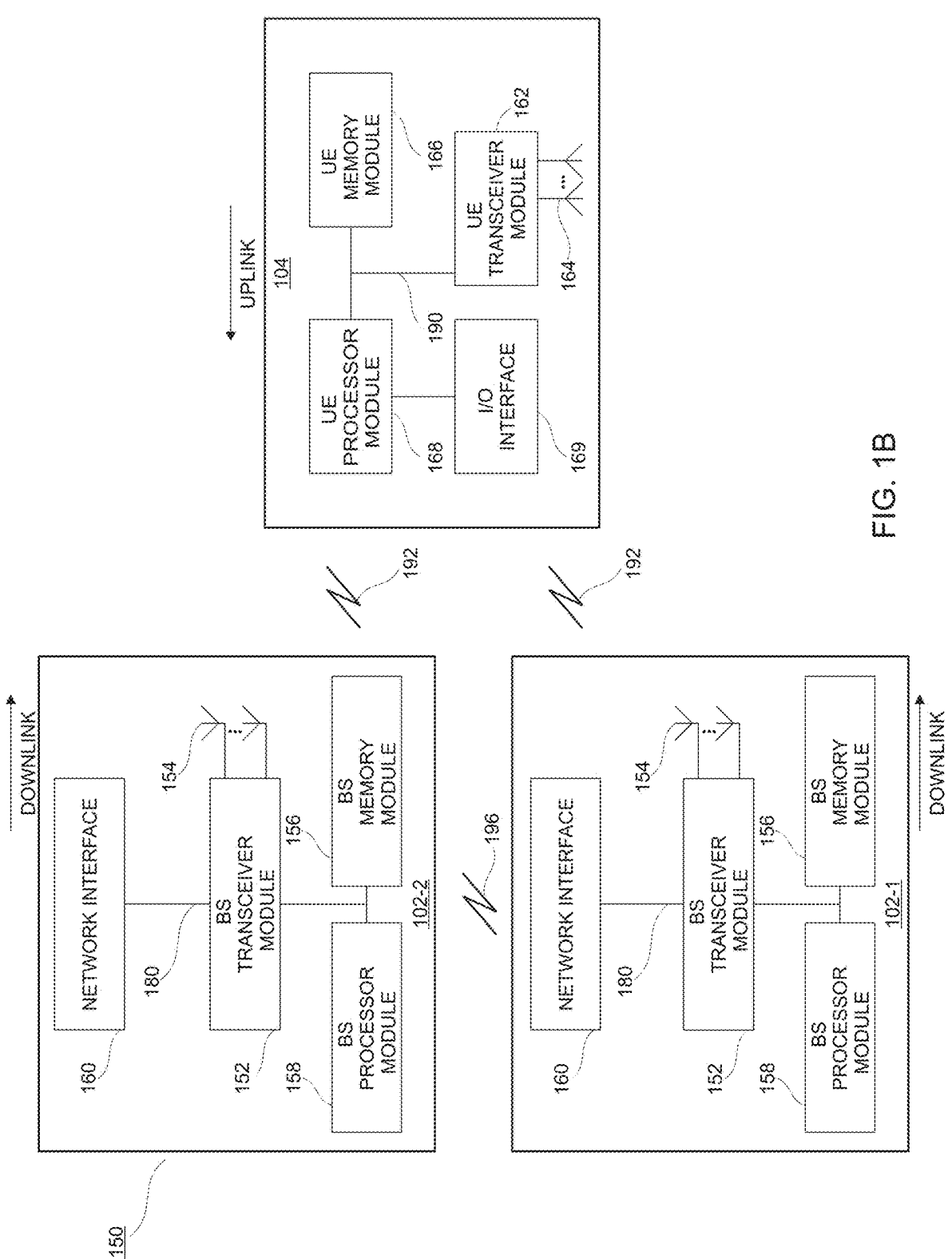
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a first BS 102-1, a second BS 102-2, and a UE 104, collectively referred to as BS 102 and UE 104 below for ease of discussion. The first BS 102-1 and the second BS 102-2 each comprises a BS transceiver module 152, a BS antenna array 154, a BS memory module 156, a BS processor module 158, and a network interface 160. In the illustrated embodiment, each module of the BS 102 is coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 is coupled and interconnected with one another as necessary via a data communication bus 190. The BS 102 communicates with the UE 104 via a communication channel 192, which can be any wireless channel suitable for transmission of data as described herein.

As would be understood by persons of ordinary skill in the art, the system 150 may further include any number of BS's, UE's or modules other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a radio frequency (RF) transmitter and receiver circuitry that is each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communicates through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD- ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively. In some embodiments, one or both of the memory modules 156 and 166 may serve as a database for storing data and/or instructions for performing machine learning, as discussed in further detail below.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to one or more UEs 104 so as to allow the UEs 104 to access the network within the cells where the BS 102 is located, and in general, to operate properly within the cell. Plural information such as, for example, downlink and uplink cell bandwidths, downlink and uplink configuration, cell information, configuration for random access, etc., can be included in the system information. Typically, the BS 102 broadcasts a first signal carrying some major system information, for example, configuration of the cell where the BS 102 is located through a Physical Broadcast Channel (PBCH). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
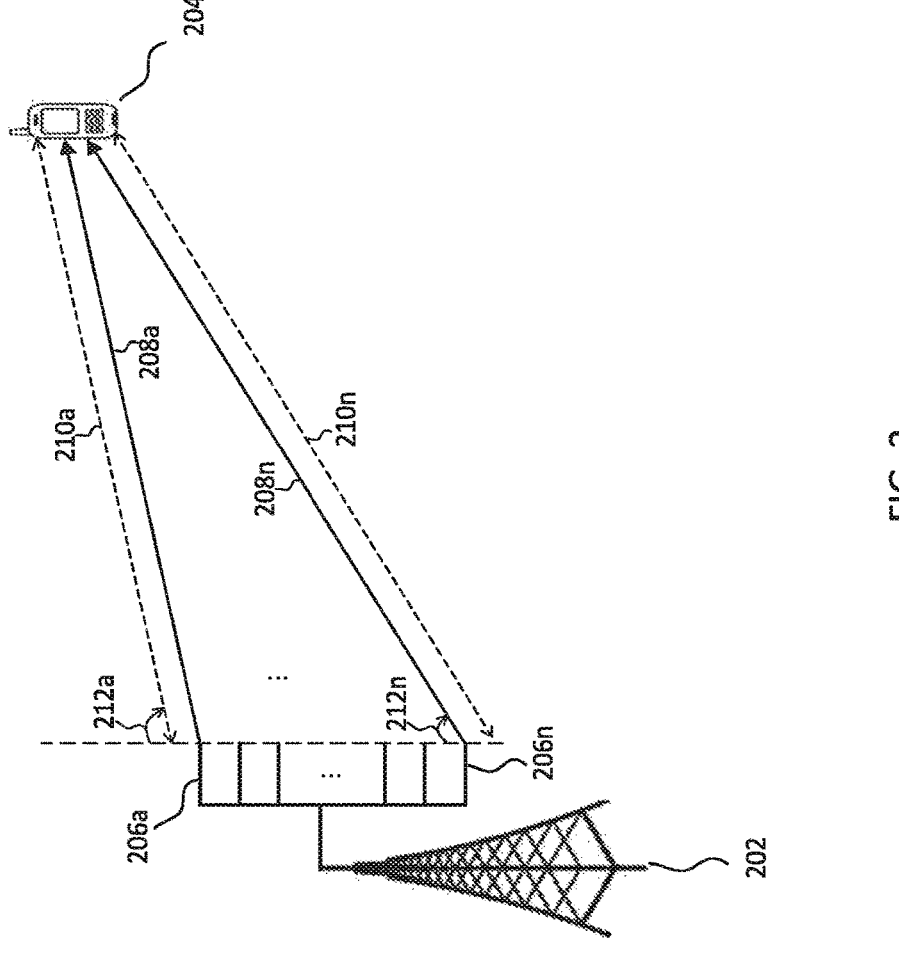
FIG. 2 illustrates another exemplary wireless communication network, in accordance with some embodiments of the present disclosure.

FIG. 2 illustrates another exemplary wireless communication network 200, in accordance with some embodiments of the present disclosure. In some embodiments, the exemplary wireless communication network 200 comprises a BS 202 and a UE 204. In some embodiments, the BS 202 comprises a plurality of antennas 206a-206n as shown. The plurality of antennas 206a-206n may be arranged in an antenna array and be in communication with the UE 204 to form a multiple input and single output (MISO) system. In some embodiments, the plurality of antennas 206a-206n is configured to form a uniform linear antenna array. In some other embodiments, the plurality of antennas 206a-206n may form a planar antenna array or a frequency scanning antenna array. Although FIG. 2 illustrates an embodiment of a MISO system, the present disclosure is not limited to MISO systems, and can be applied to other types of communication systems, such as MIMO systems, single input multiple output (SIMO) systems, and single input single output (SISO) systems.

In some embodiments, the antennas in the plurality of antennas 206a-206n are evenly spaced on a straight line, wherein each pair of neighbored antennas has a fixed distance. In some other embodiments, the antennas in the plurality of antennas 206a-206n are arranged on a straight line, wherein different pairs of neighbored antennas have different distances. In some embodiments, each of the plurality of antennas 206a-206n may be in communication with the UE 204 through a respective channel of a plurality of channels 208a to 208n, and each of the plurality of antennas 206a-206n has a respective distance 210 from the UE 204. Each of the plurality of antennas 206a-206n may also have a respective angle of departure 212 corresponding to the respective channel of the plurality of channels 208a to 208n.

In some embodiments, the distance 210 between the i-th antenna in the plurality of antennas 206a-206n and the UE 204 is denoted by $d_i$ and the carrier wavelength for the communication between the BS 202 and the UE 204 is denoted by $\lambda_c$. Assuming $d_i$ divided by the speed of light is much smaller than 1 divided by the transmission bandwidth, and $\alpha$ is an exponential coefficient, then the baseband channel gain $h_i$ of the i-th channel for communication between the i-th antenna in the plurality of antennas 206a-206n and the UE 204 may be expressed as:

$$h_i = \alpha e^{\left(-j\frac{2\pi d_i}{\lambda_c}\right)}$$

In some embodiments, the distance between the BS 202 and the UE 204 is much larger (e.g. at least 10 times larger) than the size of the antenna array where the plurality of antennas 206a-206n is located, then the distance 210 between the i-th antenna in the plurality of antennas 206a-

206$n$ and the UE 204 may be approximated as: $d_i=d_1+(i-1)\Delta\lambda_c \cos\varphi_1$, where $d_1$ is the distance 210$a$ between the first antenna 206$a$ in the plurality of antennas 206$a$-206$n$ and the UE 204, and $\varphi_1$ is the angle of departure 212$a$ for the communication between the first antenna 206$a$ and the UE 204. In alternative embodiments, the angle of departure 212$a$ can be measured in two-dimensional (2-D) or three dimensional (3-D) formats, as known in the art. For example, in a 2-D format, azimuth can be a first dimension and elevation can be a second dimension. In some embodiments, the channel parameters for each of the plurality of channels 208$a$ to 208$n$ may be arranged in a channel parameter vector. An example of the channel parameter vector is a channel gain vector h with m elements: $h=[h_1, h_1, \ldots, h_m]^T$. In some embodiments, the channel gain vector is expressed as:

$$h = \alpha e^{\left(-j\frac{2\pi d_i}{\lambda_c}\right)}\frac{1}{\sqrt{m}}\left[1, e^{-j2\pi\Delta\cos\varphi_1}, \ldots, e^{-j2\pi(m-1)\Delta\cos\varphi_1}\right]^T$$

In some embodiments, a spatial signal is defined as $$s(\varphi) = \frac{1}{\sqrt{N}}\left[1, e^{-j2\pi\Delta\cos\varphi_1}, \ldots, e^{-j2\pi(m-1)\Delta\cos\varphi_1}\right]^T \text{ and } \beta = 2\pi/\lambda_c,$$

then the channel gain vector can be expressed as: $h=\alpha e^{(-j\beta d^{1})}s(\varphi)$. In some embodiments, the channel gain vector h is determined as a function of the environment geometry, scatter materials, the transmission frequency, and the positions of the plurality of antennas 206$a$-206$n$ and the UE 204.

In some embodiments, the distance between the BS 202 and the UE 204 is much larger (e.g. at least 10 times larger) than the size of the antenna array where the plurality of antennas 206$a$-206$n$ is located. Therefore, the distances 210$a$ to 210$n$ between the plurality of antennas 206$a$-206$n$ and the UE 204 may be represented by a single parameter d, and the angles of departure 212$a$ to 212$n$ between the plurality of antennas 206$a$-206$n$ and the UE 204 may be represented by a single parameter $\varphi$. In some embodiments, the UE 204 may be in movement while communicating with the BS 202. The UE 204 may move to a plurality of positions (e.g. N positions) expressed as $x_j$, j=1, . . . N while communicating with the BS 202. In some embodiments, the j-th position in the plurality of positions may be expressed as a function of the parameters d and $\varphi$: $x_j(d,\varphi)$. As discussed above, in accordance with various embodiments, the position parameters described herein may be expressed in various 2-D and/or 3-D formats known in the art.

Since the channel gain vector h is a function of the UE position, when the UE 204 moves from one position to another, the channel gain vector h is also supposed to change accordingly. Therefore, there exists a mapping between the UE position and the corresponding channel gain vector h. In some embodiments, each of the plurality of positions $x_j(d, \varphi)$, j=1, . . . N can be mapped to a corresponding channel gain vector $h_j$ using a position-to-channel mapping function $f$: $\{x_j(d,\varphi)\}\rightarrow\{h_j\}$.

In some embodiments, the position-to-channel mapping function g is to be learned from a plurality of samples, wherein each sample comprises a distinct position value $x_i(d,\varphi)$ and a corresponding channel gain vector $h_i$. In one embodiment, the position-to-channel mapping function $f$ is learned from the plurality of samples using a machine learning model. Examples of the machine learning models that can be used to learn the position-to-channel mapping function $f$ include, but is not limited to: artificial neural network (ANN), case-based reasoning model, decision tree model, inductive logic programming, Gaussian process model, genetic algorithm, Kernel estimators, Gaussian naive Bayes classifier, maximum entropy classifier, conditional random field, nearest neighbor algorithm, linear regression model, logistic regression model, support vector machine (SVM), random forest, ensembles of classifiers. In some embodiments, the position-to-channel mapping function $f$ is learned from a plurality of samples using an ANN model, wherein each sample comprises a distinct position value $x_i(d,\varphi)$ and a corresponding channel gain vector $h_i$.

Figure 3:
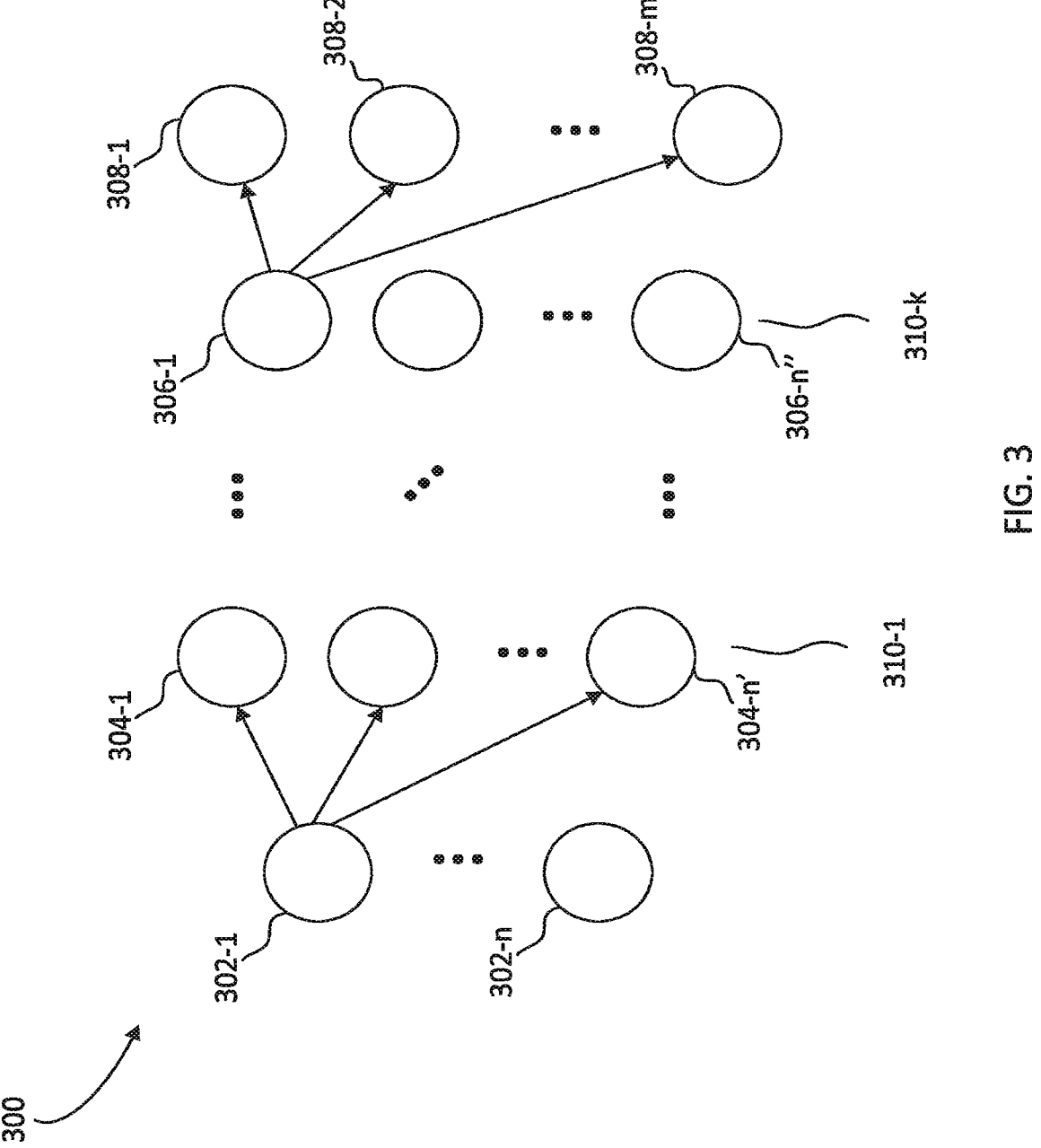
FIG. 3 illustrates an artificial neural network model, in accordance with some embodiments of the present disclosure.

FIG. 3 illustrates an ANN model 300 used to implement the position-to-channel mapping function $f$. In some embodiments, the ANN model 300 comprises n inputs 302-1 to 302-$n$, k hidden layers 310-1 to 310-$k$ as shown, and m outputs 308-1 to 308-$m$ as shown. In some embodiments, the n inputs 302-1 to 302-$n$ can be arranged in an input vector $o=[o_1, \ldots, o_n]$ that corresponds to a distinct position value $x_i(d,\varphi)$ expressed in a vector of n elements, and the m outputs 308-1 to 308-$m$ can be arranged in an output vector $o(k+1)=[o_1, \ldots, o_m]$ corresponding to the channel gain vector $h=[h_1, h_1, \ldots, h_m]^T$ expressed in a vector of m elements. In one embodiment, the ANN model 300 comprises a first hidden layer 310-1 comprising n' inputs 304-1 to 304-$n'$, and the output vector of the first hidden layer 310-1 may be denoted by o(1) and computed using o(1)=s (o*W1), where s is a nonlinear activation function and W1 is a weight matrix connecting the input vector o to the first hidden layer. In the same way, the output vector o(k+1)= [o1, . . . , om] may be computed using o(k+1)=s( . . . (s(s(o*W1)*W2)) . . . *Wk+1), where Wf(f<k) is a weight matrix connecting the (f−1)-th hidden layer to the f-th hidden layer, and Wk is a weight matrix connecting the k-th hidden layer 310-$k$ to the output vector o(k+1). In one embodiment, the k-th hidden layer 310-$k$ comprises n" inputs 306-1 to 306-$n''$.

In some embodiments, the ANN model 300 is trained using a plurality of samples, wherein each sample comprises a distinct position value $x_i(d,\varphi)$ and a corresponding channel gain vector $h_i$. In one embodiment, to find the optimal values of the weight matrices W1 to Wk+1 during the training of the ANN model 300, a back propagation algorithm is used by taking an error rate of a forward propagation and feeding this loss backward through the layers of the ANN model 300 to fine-tune the weights. In another embodiment, to find the optimal values of the weight matrices W1 to Wk+1 during the training of the ANN model 300, a weight perturbation technique can be used. The weight perturbation technique may be applied in an iterative manner for a plurality of iterations, wherein in each of the plurality of iterations, a weight variation of random sign is added to each of the elements in the weight matrices W1 to Wk+1 and a corresponding training error is observed. If the training error is increased in a given iteration, then the elements in the weight matrices W1 to Wk+1 will be changed to the opposite directions of the weight variations; if the training error is decreased in a given iteration, then the elements in the weight matrices W1 to Wk+1 will be changed to the same directions of the weight variations. This iterative training can be stopped if at least one of the following conditions is met: the training error becomes smaller than a predetermined error threshold value, a maximum number of iterations is reached, and the training error does not decrease for a predetermined number of iterations. In some embodiments, a dynamic weight perturbation technique can be applied to train the ANN model 300 by decreasing the amount of weight variations in each iteration, such that the ANN model 300 is fine-tuned towards the end of the training process. In one embodiment, the weight variation in the t-th iteration $v_t$ can be calculated as: $v_t = v_0/(t^\lambda)$, where $v_0$ is an initial weight variation amount, and $\lambda$ is a user-defined parameter which controls the decrease rate of $v_t$.

In some embodiments, the BS 202 is configured to track the real time position of the UE 204 while the UE 204 is in movement. Examples of methods that can be employed by the BS 202 to track the real time position of the UE 204 include, but not limited to: global navigation satellite system (GNSS), global positioning system (GPS), Galileo public regulated service, positioning reference signal (PRS), sounding reference signal (SRS) for positioning, device-to-device (D2D)-assisted positioning technologies, radar, light detection and ranging (LiDAR), and the camera-based position techniques. In some embodiments, the BS 202 continuously updates a training database by adding new entries associated with new tracked UE 204 positions. That is, each new entry added to the training database comprises a new position value $x_{i+1}(d,\varphi)$ and a new corresponding channel gain vector $h_{i+1}$. The newly added entries can expand the training database such that more training samples can be used to train the position-to-channel mapping function $f$. In this way, the position-to-channel mapping function $f$ becomes more accurate over time.

In some embodiments, the BS 202 is configured to store a previously learned position-to-channel mapping function $f$ in the BS memory module 156. Then the BS 202 may be configured to obtain a real-time position $x_k(d,\varphi)$ of the UE 204, and use the previously learned position-to-channel mapping function $f$ to provide an estimate $\hat{h}_k$ of the actual channel gain vector $h_k$ that corresponds to the real-time UE position $x_k(d,\varphi)$. In some embodiments, a precoder $w_k$ may be used to compensate distortions encountered during signal transmission in the channel based on the estimate $\hat{h}_k$. Examples of precoding compensation methods include, but not limited to: maximum ratio transmission (MRT), zero forcing (ZF), least square (LS), minimum mean squared error (MMSE), linear minimum mean square error (LMMSE), and interpolation algorithm.

In some embodiments, the location of the UE 204 may have low mobility in deployments such as factory floors or warehouses. In these situations, constant position tracking of the UE 204 may not be required. In one embodiment, the BS 202 tracks an initial position of the UE 204 at an initial tracking frequency, then based on a predetermined number of tracked UE 204 positions, the BS 202 may estimate an initial speed of the UE 204. If the initial speed of the UE 204 is less than a predetermined UE speed low threshold, then the BS 202 may decrease the tracking frequency by a predetermined frequency amount. On the other hand, if the initial speed of the UE 204 is higher than a predetermined UE speed high threshold, then the BS 202 may increase the tracking frequency by a predetermined frequency amount. This dynamic tracking procedure can be implemented on the BS 202 such that the BS 202 continuously estimates the speed of the UE 204, and updates the tracking frequency based on the real-time speed of the UE 204.

Figure 4:
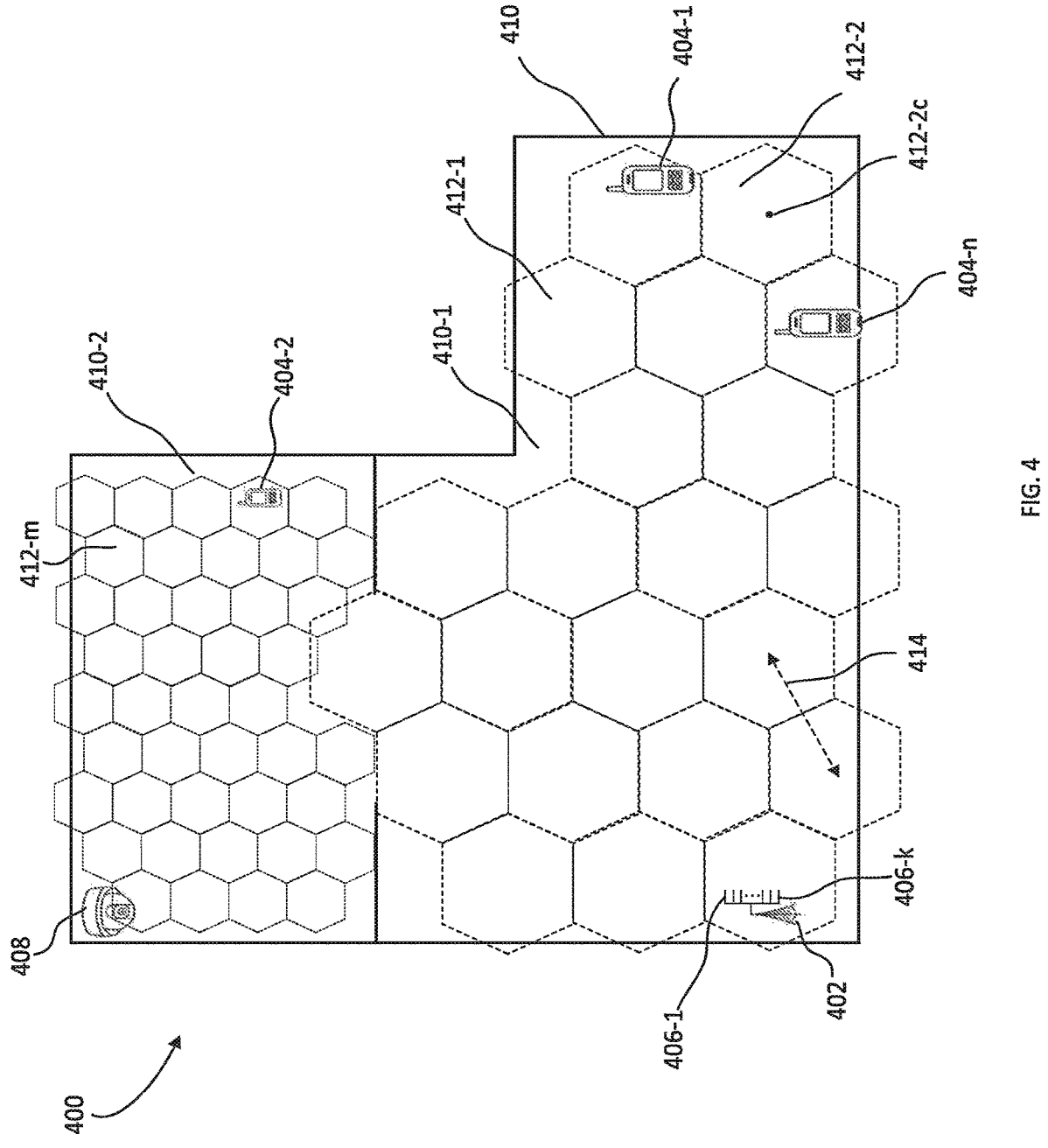
FIG. 4 illustrates a top view of an exemplary scenario of a user equipment channel estimation, in accordance with some embodiments.

FIG. 4 illustrates a top view of an exemplary scenario of UE channel estimation, in accordance with some embodiments. In some embodiments, a BS 402 is attached to a ceiling of a factory floor 410, wherein the ceiling of the factory floor 410 provides wireless communication coverage to a plurality of UEs 404-1 to 404-n as shown. The BS 402 may be configured to include a plurality of antennas 406-1 to 406-k as shown. In some embodiments, the plurality of antennas 406-1 to 406-k in the BS 402 and the plurality of UEs 404-1 to 404-n form a MIMO system. In some embodiments, the factory floor 410 comprises two rooms 410-1 and 410-2. The room 410-2 may comprise a machine-vision camera 408 to track the real time positions of the plurality of UEs 404-1 to 404-n. In one embodiment, the machine-vision camera 408 communicates with the BS 402 to provide periodic positioning updates for the plurality of UEs 404-1 to 404-n to the BS 402.

In some embodiments, the factory floor 410 is divided into a plurality of virtual areas 412-1 to 412-m as shown in FIG. 4. Although FIG. 4 shows the plurality of virtual areas 412-1 to 412-m as having hexagon shapes, the shapes of the plurality of virtual areas 412-1 to 412-m are not limited to hexagon and can be any other types of suitable shapes, such as: circle, oval, heptagon, pentagon, rectangle, triangle, ellipse, trapezoid, rhombus, square, and heptagon. In some embodiments, a distance 414 is used to represent the distance between two adjacent virtual areas in the plurality of virtual areas 412-1 to 412-m. In one embodiment, the distance 414 is calculated as the distance between the geometric center points of two adjacent virtual areas. In some embodiments, each of the plurality of virtual areas 412-1 to 412-m is represented by one single location $x(d,\varphi)$ which corresponds to the location of its geometric center point. For example, all points within the virtual area 412-2 may be represented by the location $x(d,\varphi)$ of the geometric center 412-2c of the virtual area 412-2.

In some embodiments, the BS 402 is configured to store the locations of the plurality of virtual areas 412-1 to 412-m in the BS memory module. For example, if the factory floor 410 comprises M virtual areas, then the BS 402 can be configured to store the locations of the M virtual areas represented by the locations of M geometric centers of the M virtual areas: $[x_1(d,\varphi), x_2(d,\varphi), \ldots, x_M(d,\varphi)]$. The distance 414 may be then a design trade-off between having a minimum number of entries required to cover the whole region of the factory floor 410 and the accuracy of channel estimates.

In one embodiment, each of the plurality of virtual areas 412-1 to 412-m has the same size and same shape. In another embodiment, different virtual areas in the plurality of virtual areas 412-1 to 412-m have the same shape but different sizes. For example, the virtual areas in the room 410-1 may have a larger size than the size of the virtual areas in the room 410-2. In such a case, the distance 414 between two adjacent virtual areas in the room 410-1 is larger than the distance 414 between two adjacent virtual areas in the room 410-2. In yet another embodiment, different virtual areas in the plurality of virtual areas 412-1 to 412-m have different shapes and different sizes.

In some embodiments, a UE 404 is configured to transmit a sounding reference signal (SRS) to the BS 402 in an uplink direction. Upon receiving the SRS, the BS 402 may use the SRS to estimate the uplink channel quality over a wider bandwidth. In one embodiment, the BS 402 can exploit channel reciprocity in a time division duplex (TDD) to estimate the downlink channel quality. That is, a TDD system uses the same frequency band for uplink (UL) and downlink (DL) transmissions, and the radio channel is reciprocal because it has the same characteristics in both UL and DL directions. Exploiting this reciprocity, the BS 402 can use a UL transmission to obtain a channel estimate and then use this channel estimate to calculate parameters for a DL transmission. In another embodiment, the BS 402 communicates with the UE 404 in a frequency-division duplexing (FDD) procedure, and the UE 404 uses channel state information reference signal (CSI-RS) to estimate the downlink channel and report the channel quality information (CQI) to the BS 402.

In some embodiments, the UE 404 is configured to move to a plurality of positions in the factory floor 410, wherein the plurality of positions correspond to the locations of the plurality of virtual areas 412-1 to 412-*m*. In one embodiment, at each of the plurality of positions, the BS 402 performs channel estimation to obtain an estimate ĥ of the channel gain vector that corresponds to each of the plurality of positions. For example, the UE 404 may be configured to move to a total number of M positions corresponding to the geometric centers of M virtual areas. The M positions may be expressed by: $\{x_1, \ldots, x_M\}$. Each of the M positions can be expressed by one of the followings: a combination of a distance d between the BS 402 and the UE 404 and a departure angle φ: x(d,φ), a combination of a longitudinal coordinate g and a lateral coordinate l: x(g,l), and a combination of a longitudinal coordinate g, a lateral coordinate l, and a vertical coordinate v: x(g,l,v). In some embodiments, when the BS 402 receives a position of the UE 404, the BS 402 performs a corresponding channel estimation. For example, the BS 402** may be configured to perform channel estimations to obtain M estimates of the channel gain vectors: $\{\hat{h}_1, \ldots, \hat{h}_M\}$ that correspond to the M UE positions $\{x_1, \ldots, x_M\}$, respectively.

In some embodiments, the BS 402 is configured to store the M UE positions $\{x_1, \ldots, x_M\}$ and the corresponding M estimated channel gain vectors: $\{\hat{h}_1, \ldots, \hat{h}_M\}$ in a database in the BS memory module. In one embodiment, each of the M estimated channel gain vectors comprises a corresponding plurality of coefficients for each of the plurality of antennas 406-1 to 406-*k*. In some other embodiments, the BS 402** may be configured to store computed maximum ratio transmission (MRT) precoding parameters, indices of grid of beams, UE feedback such as rank indicator (RI), or precoding matrix index (PMI) for channel estimation. The stored computed maximum ratio transmission (MRT) precoding parameters, indices of grid of beams, UE feedback such as rank indicator (RI), or precoding matrix index (PMI) may be mapped to a corresponding UE position for each of the M UE positions $\{x_1, \ldots, x_M\}$.

Figure 5:
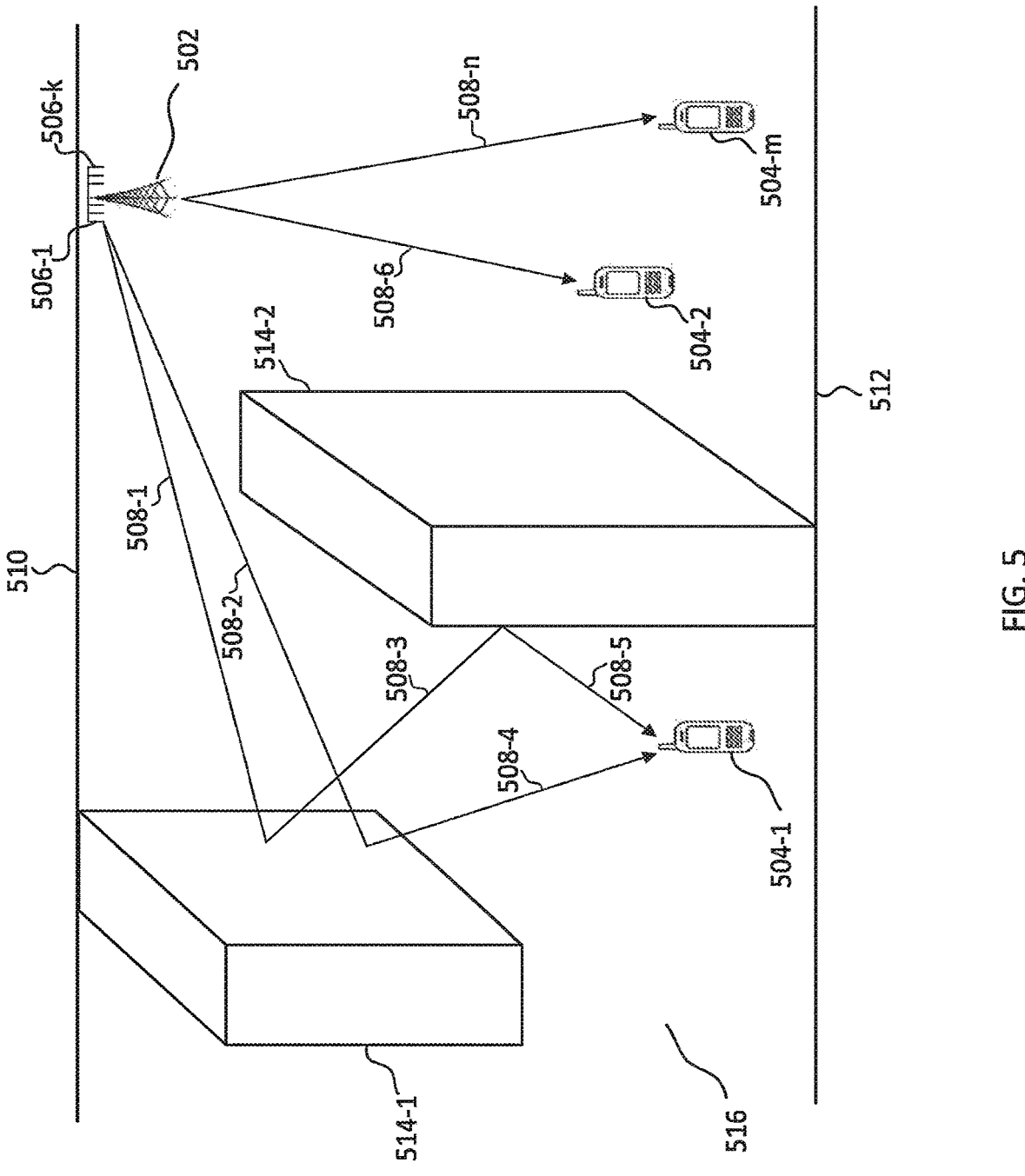
FIG. 5 illustrates another exemplary scenario of a user equipment channel estimation, in accordance with some embodiments.

In some embodiments, there exists no straight line-of-sight (LOS) between the BS 402 and the UE 404. In such a case, the communication between the BS 402 and the UE 404 occurs in a non-line-of-sight (NLOS) scenario. FIG. 5 illustrates another exemplary scenario of UE channel estimation, in accordance with some embodiments. In some embodiments, at least two obstacles 514-1 and 514-2 exist in a room 516 comprising a ceiling 510 and a floor 512. A BS 502 comprising a plurality of antennas 506-1 to 506-*k* may be placed in the room 516 to provide wireless communication coverage of the entire room 516. The BS 502 may be in communication with a plurality of UEs 504-1 to 504-*m* as shown. In one embodiment, the BS 502 communicates with the UEs 504-2 and 504-*m* through LOS channels 508-6 and 508-*n*, respectively, since there exists a straight LOS between the BS 502 and the UEs 504-2 and 504-*m*. In another embodiment, there exists no LOS between the BS 502 and the UE 504-1. Then multiple beams are needed for communication between the BS 502 and the UE 504-1. For example, the BS 502 transmits a beam 508-1 to the obstacle 514-1, then a reflected beam 508-3 is transmitted from the obstacle 514-1 to the obstacle 514-2, then a reflected beam 508-5 is transmitted from the obstacle 514-2 to the UE 504-1. As another example, the BS 502 transmits a beam 508-2 to the obstacle 514-1**, then a reflected beam

508-4 is transmitted from the obstacle 514-1 to the UE 504-1. In some embodiments, the UE 504-1 is placed in a position denoted by $\hat{x}_1$ which corresponds to an estimated channel gain vector $\hat{h}_1$, wherein $\hat{h}_1$ comprises parameters of a plurality of beams including 508-1, 508-2, 508-3, 508-4 and 508-5.

Referring back to FIG. 4, in some embodiments, the plurality of UEs 404-1 to 404-*n* may be fixed at their locations $\{x_1, \ldots, x_n\}$ without any movements. Then the BS 402 may estimate channels for each of the plurality of UEs 404-1 to 404-*n* to obtain the corresponding estimated channel gain vectors: $\{\hat{h}_1, \ldots, \hat{h}_n\}$. The position-to-channel mapping function g may be then learned using $\{x_1, \ldots, x_n\}$ and $\{\hat{h}_1, \ldots, \hat{h}_n\}$. In some other embodiments, each of the plurality of UEs 404-1 to 404-*n* moves to a corresponding plurality of positions, and the BS 402 may be configured to estimate channels of each of the plurality of positions for each of the plurality of UEs 404-1 to 404-*n*. Then the position-to-channel mapping function $f$ may be learned using the plurality of positions for each of the plurality of UEs 404-1 to 404-*n* and the corresponding estimated channels of each of the plurality of positions for each of the plurality of UEs 404-1 to 404-*n*.

In some embodiments, after the BS 402 stores a database comprising a plurality of UE positions, for example, M UE positions $\{x_1, \ldots, x_M\}$ and their corresponding M estimated channel gain vectors: $\{\hat{h}_1, \ldots, \hat{h}_M\}$, the BS 402 can be configured to provide channel estimation for a new UE position not previously stored in the data base. In one embodiment, the BS 402 learns a position-to-channel mapping function $f$ based on $\{x_1, \ldots, x_M\}$ and $\{\hat{h}_1, \ldots, \hat{h}_M\}$, $f:\{x\}\rightarrow\{h\}$, then for a new UE position $x_k$ tracked by the BS 402, the BS 402 employs the previously learned position-to-channel mapping function $f$ to provide the channel estimation for $x_k$: $\hat{h}_k=f(x_k)$. In accordance with various embodiments, each position (e.g., $x_k$, $\{x_1, \ldots, x_M\}$) can be expressed as coordinates in two-dimensional or three-dimensional coordinate systems known in the art.

In some other embodiments, the BS 402 stores a database comprising $\{x_1, \ldots, x_M\}$ and $\{\hat{h}_1, \ldots, \hat{h}_M\}$ in the BS memory module, then for a new UE position xx tracked by the BS 402, the BS 402 may query the database by comparing $x_k$ to $\{x_1, \ldots, x_M\}$ stored in the database. The query may end when an i-th position $x_i$ in $\{x_1, \ldots, x_M\}$ is found such that the following condition is met: $\|x_k-x_i\|\leq\Delta d/2$, where the operator $\|\cdot\|$ represents a distance between $x_k$ and $x_i$, and $\Delta d$ denotes the distance 414 between the center points of two adjacent virtual areas. In other words, $x_i$ is found from $\{x_1, \ldots, x_M\}$ to be the nearest position to $x_k$. In some embodiments, $x_k$ and each position of $\{x_1, \ldots, x_M\}$ are expressed as two-dimensional coordinate system values for longitude and latitude, respectively, g and l: such that $x_k=\{g_k,l_k\}$ and $x_i=\{g_i,l_i\}$. In such a case, the condition is expressed as:

$$\left| \sqrt{(g_k^2 + l_k^2)} - \sqrt{(g_i^2 + l_i^2)} \right| \leq \Delta d/2$$

Once $x_i$ found to satisfy the condition $\|x_k-x_i\|\leq\Delta d/2$, the corresponding channel gain vector $\hat{h}_i$ stored in the database may be used to estimate the channel for the new position $x_k$ using $\hat{h}_k=\hat{h}_i$. In some embodiments, a precoder $w_i$ corresponding to $\hat{h}_i$ may be used to compensate distortions encountered during signal transmissions from the UE 404 at position $x_k$ to the BS 402. In one embodiment, the BS 402 sets up a network configuration timer and transmits a channel state information reference signal (CSI-RS) to the UE 404. Then the UE 404 may be configured to measure the channel state information (CSI) feedback parameters and send the CSI feedback parameters back to the BS 402. Upon receiving the CSI feedback parameters and before the network configuration timer expires, the BS 402 may schedule DL data transmissions such as modulation scheme, code rate, number of transmission layers, and MIMO precoding, and compute downlink channel state information parameters such as CQI, PMI for MIMO scenarios, and RI, accordingly. In some embodiments, the BS 402 adjusts the channel gain vector $\hat{h}_i$ before the network configuration timer expires based on the received CSI feedback parameters from the UE 404.

In some embodiments, the BS 402 receives a new tracked position $x_k$ and queries the database by comparing $x_k$ to $\{x_1, \ldots, x_M\}$ stored in the database, however, the BS 402 may not find any entries in $\{x_1, \ldots, x_M\}$ that satisfies the condition $\|x_k - x_i\| \leq \Delta d/2$ for i=1, ..., M. In such a case, the BS 402 may consider $x_k$ as a new position that is added to the database. Therefore, the BS 402 may update the database to have $\{x_1, \ldots, x_M, x_k\}$. In one embodiment, after adding the new position $x_k$ to the database, the BS 402 may broadcast a request to the UE 404 for channel estimation of the new position $x_k$. In accordance with various embodiments, the request may be broadcast using known broadcast and/or paging techniques known in the art. Alternatively, the BS 402 may send the request to one or more specific UE's 404 via dedicated signaling (e.g., a radio resource control (RRC) message). After receiving the channel estimation request, the UE 404 may then transmit an SRS to the BS 402. Upon receiving the SRS, the BS 402 may use the SRS to perform a channel estimation to obtain the estimated channel gain vector $\hat{h}_k$ that corresponds to $x_k$. The BS 402 may then update the database to include $\hat{h}_k$: $\{\hat{h}_1, \ldots, \hat{h}_M, \hat{h}_k\}$. In some embodiments, the BS 402 is configured to continuously track the positions of the plurality of UEs 404-1 to 404-n, such that the BS 402 can include more entries to the database over time. Therefore, the database may become larger over time with more locations and their corresponding channel estimates added.

In some other embodiments, for a new tracked position $x_k$, the BS 402 may not find any entries in $\{x_1, \ldots, x_M\}$ that satisfies the condition $\|x_k - x_i\| \leq \Delta d/2$ for i=1, ..., M. Instead of requesting an SRS transmission, the BS 402 may assume an initial MISO LOS channel model associated with a position in $\{x_1, \ldots, x_M\}$ that has the closest distance to $x_k$. Then the BS 402 may communicate with the UE 404 based on the assumed MISO LOS channel model. If the transmission is successful, then the BS 402 stores $x_k$ along with the channel estimates associated with the initial MISO LOS channel model in the database. If the transmission is not successful, then the BS 402 may broadcast a request to the UE 404 for channel estimation of the new position $x_k$.

Figure 6:
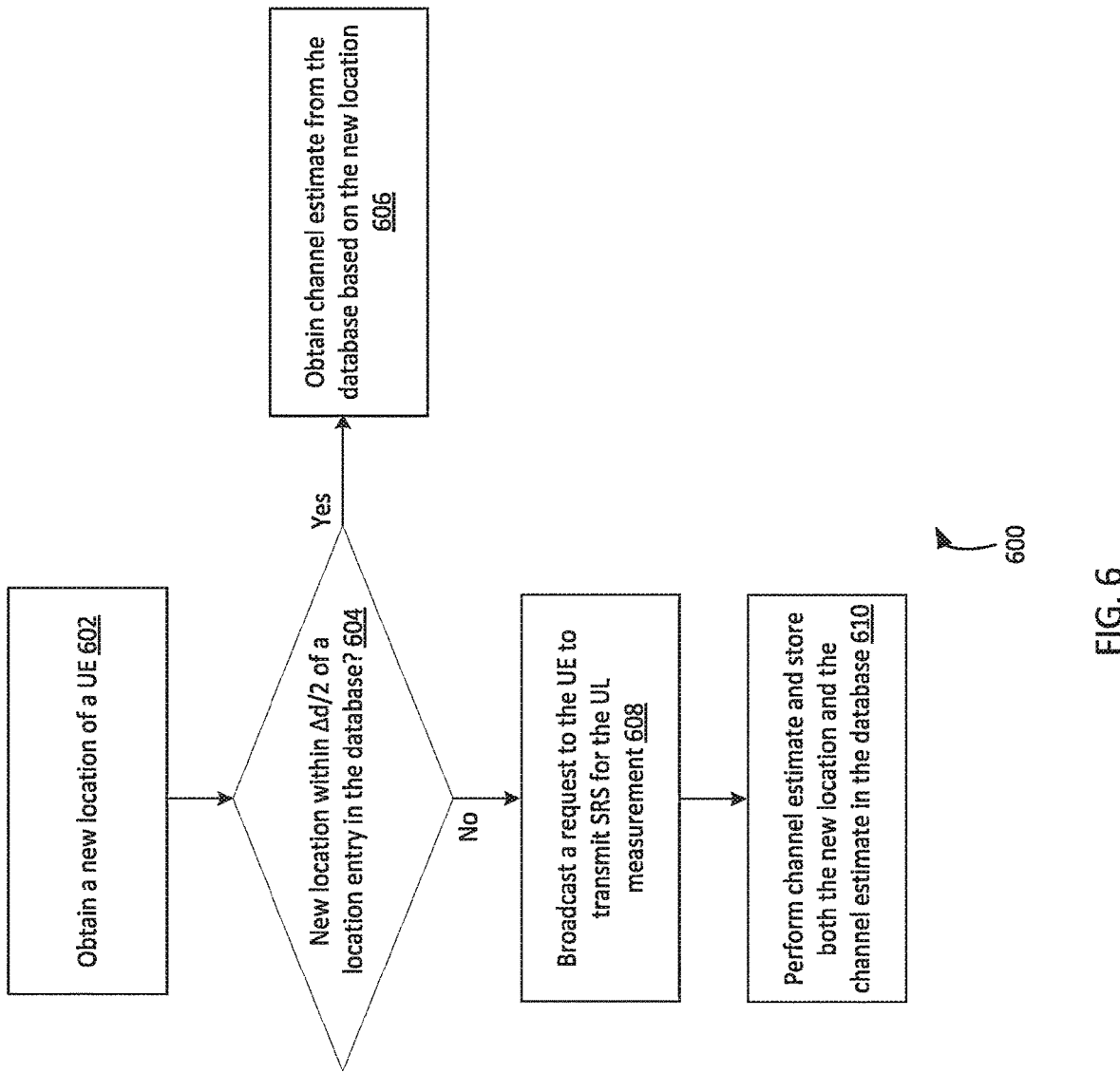
FIG. 6 illustrates an example method for performing channel estimation, in accordance with some embodiments.

FIG. 6 illustrates an example method 600 for performing channel estimation for at least one UE based on the tracked locations of the at least one UE, in accordance with some embodiments. The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. 6 and described below is not intended to be limiting.

At step 602, a new location of a UE is obtained. In some embodiments, a BS is configured to continuously track the location of the UE using at least one of the following methods: GNSS, GPS, Galileo public regulated service, PRS, SRS for positioning, D2D-assisted positioning technology, radar, LiDAR, and camera-based position technique. In one embodiment, the BS is configured to store a plurality of predetermined locations associated with a corresponding plurality of channel estimates in a database for further processing.

At step 604, whether the new UE location is within $\Delta d/2$ of a location entry in the database is determined. If the new UE location is determined to be within $\Delta d/2$ of a location entry in the database, then move to step 606; otherwise move to step 608. In some embodiments, a cell area covered by the BS is partitioned into a plurality of virtual areas having shapes such as circle, oval, heptagon, pentagon, rectangle, triangle, ellipse, trapezoid, rhombus, square, and heptagon. In some embodiments, the distance $\Delta d$ is calculated as the distance between the geometric centers of two adjacent virtual areas in the plurality of virtual areas.

At step 606, a channel estimate is obtained from the database based on the new location. In some embodiments, the database comprises a plurality of locations (for example, M locations $\{x_1, \ldots, x_M\}$) and a corresponding plurality of channel estimates (for example, M channel gain vectors: $\{\hat{h}_1, \ldots, \hat{h}_M\}$). If a new UE location xx is determined to be within $\Delta d/2$ of a location entry $x_i$ in the database, then the channel estimate for $x_k$ can be $\hat{h}_i$ from the database that corresponds to the location $x_i$.

At step 608, a request to the UE to transmit SRS for the UL measurement is broadcasted. In some embodiments, the BS broadcasts a request for channel estimation to the UE, and the UE transmits the SRS back to the BS in an uplink direction.

At step 610, channel estimation corresponding to the new location is performed and both the new location and the channel estimate are stored in the database. In some embodiments, upon receiving the SRS, the BS uses the SRS to estimate the uplink channel quality over a wider bandwidth. In one embodiment, the BS exploits the channel reciprocity in a TDD to estimate the downlink channel quality. In another embodiment, the BS communicates with the UE in an FDD procedure, and the UE uses CSI-RS to estimate the downlink channel and report the CQI back to the BS as part of the channel estimate.

Referring back to FIG. 4, in some embodiments, the distance 414 between two adjacent virtual areas may be selected such that the areas of the virtual areas 412-1 to 412-m are maximized while any location points within a specific virtual area has a spatial correlation value with the geometric center of the virtual area, wherein the spatial correlation value is higher than or equal to a predetermined correlation threshold value. In some embodiments, the spatial correlation value is defined as a change in the channel from the geometric center of a specific virtual area to a given point within the virtual area due to path loss, shadowing and small-scale fading. For example, given a virtual area 412 comprising a geometric center position denoted by $x_i$ with the corresponding channel $h_i$, a new point within the virtual area 412 that is different from $x_i$ can be denoted by $x_k$. Suppose that $x_k$ has a corresponding channel denoted by $h_k$, then a spatial correlation value $\rho$ between $x_i$ and $x_k$ can be defined as: $\rho(x_i, x_k) = c(h_i, h_k)$, where $c(\bullet)$ represents a correlation function used to compute the similarity between $h_i$ and $h_k$. Examples of the correlation function include, but is not limited to: a Pearson correlation function, a cross-correlation function, a canonical correlation function, an R-squared correlation function, a spurious correlation function, and a concordance correlation function.

Figure 7:
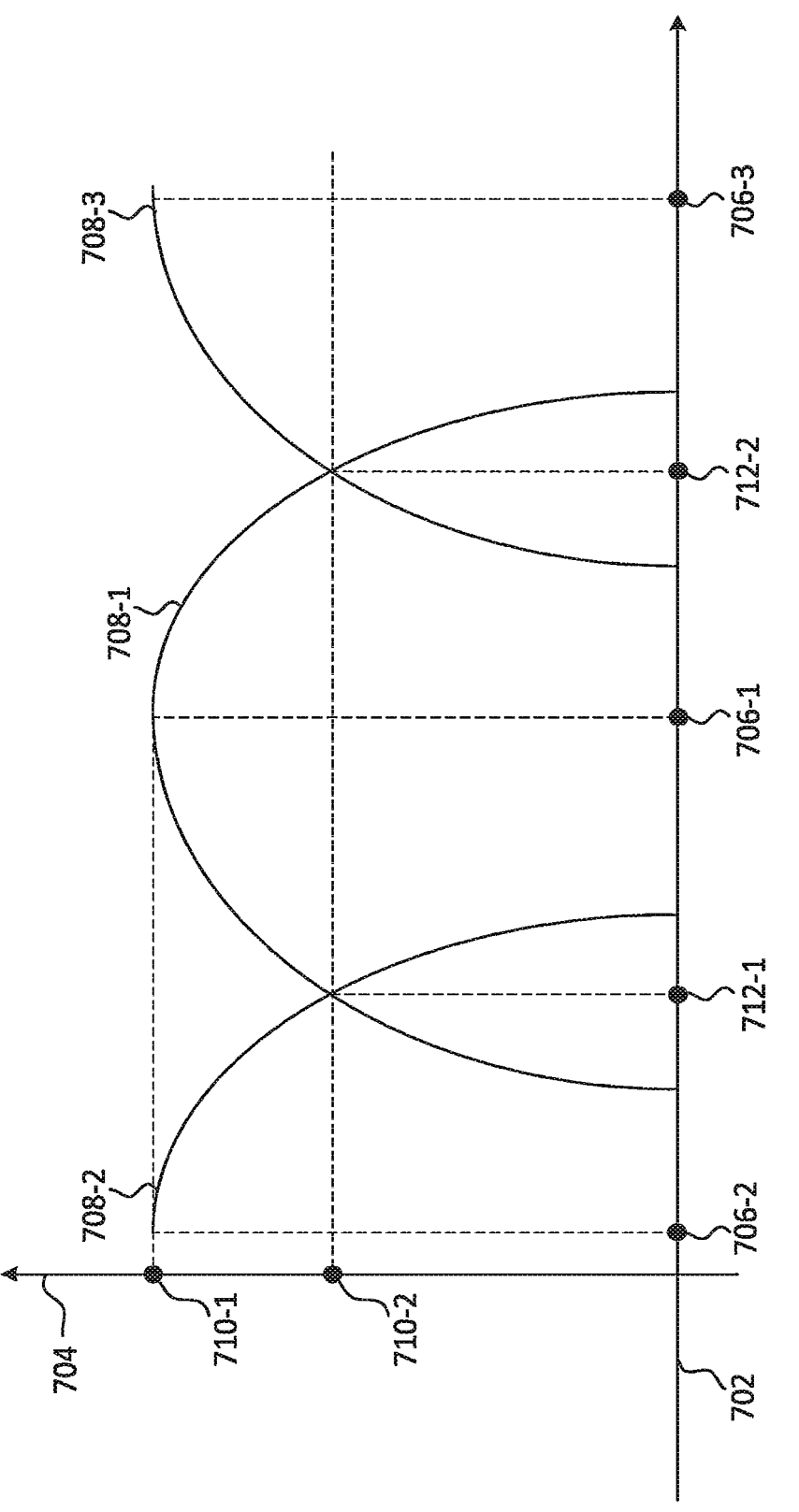
FIG. 7 illustrates an example of channel spatial correlation, in accordance with some embodiments.

FIG. 7 illustrates an example of channel spatial correlation, in accordance with some embodiments. In some embodiments, the channel spatial correlation example comprises an axis 702 representing UE positions in one dimension and an axis 704 representing the channel spatial correlation value $\rho$. In some embodiments, the channel spatial correlation value $\rho$ ranges from 0 to 1: $0 \leq \rho \leq 1$. In one embodiment, 3 virtual areas have 3 geometric center positions represented by points 706-1, 706-2, and 706-3 along the axis 702.

Figure 8:
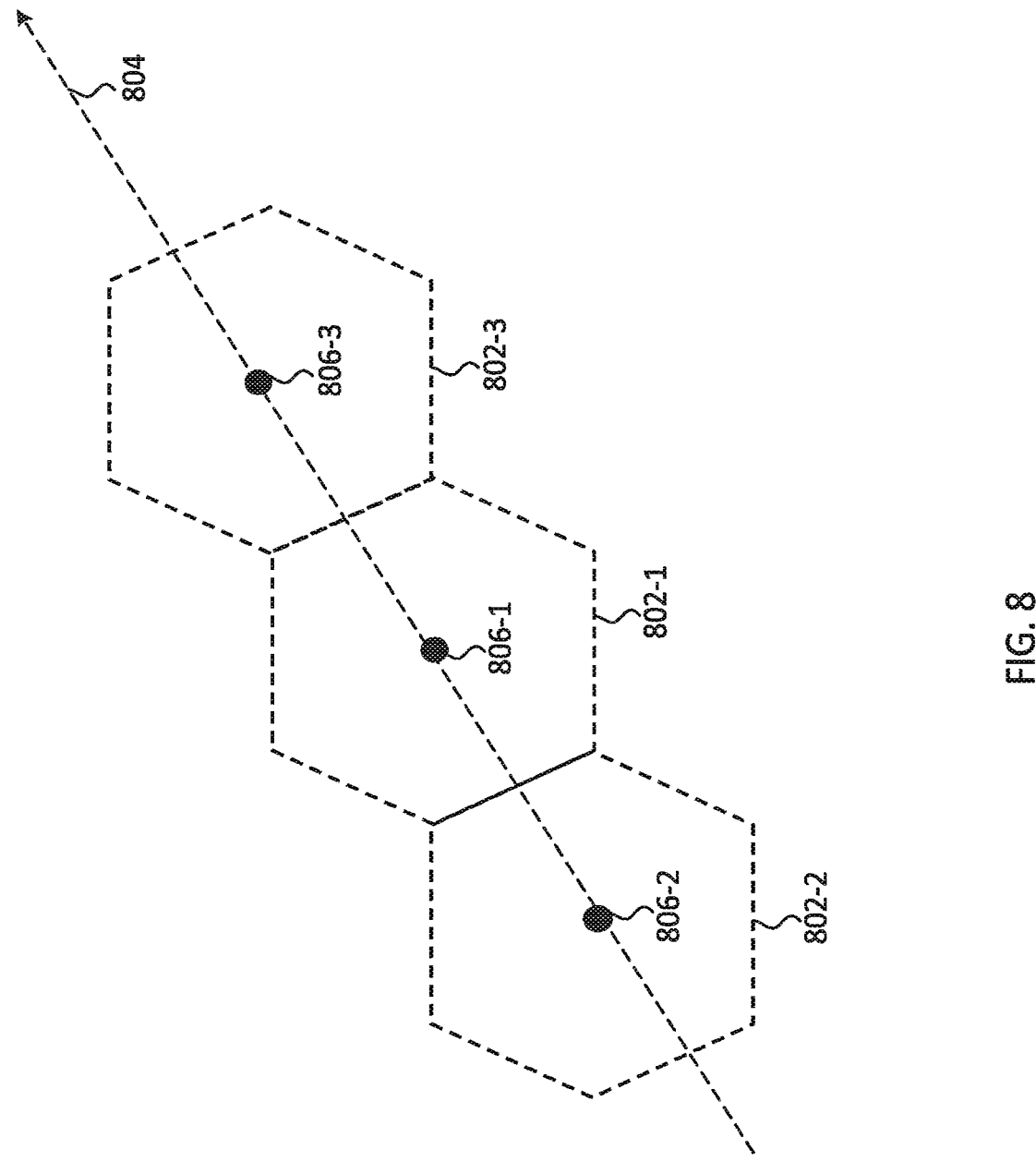
FIG. 8 illustrates an example of three virtual areas, in accordance with some embodiments.

FIG. 8 illustrates that the 3 geometric centers 706-1, 706-2, and 706-3 of FIG. 7 can correspond to the 3 points 806-1, 806-2, and 806-3, respectively, as shown in FIG. 8, which illustrates an example of 3 virtual areas 802-1, 802-2, and 802-3. In some embodiments, a virtual axis 804 illustrated in FIG. 8 corresponds to the axis 702 in FIG. 7. In some embodiments, the channel spatial correlation value between a UE moving along the axis 702 and the point 706-1 can be represented by the curve 708-1. In one embodiment, the channel spatial correlation value 710-1 is equal to 1 on the curve 708-1 at the point 706-1, which represents the highest correlation value when the UE is at the location 706-1. Likewise, the channel spatial correlation value between the UE moving along the axis 702 and the point 706-2 can be represented by the curve 708-2, and the channel spatial correlation value between the UE moving along the axis 702 and the point 706-3 can be represented by the curve 708-3.

In some embodiments, when the UE is at the point 706-1 and the channel gain vector at the point 706-1 may be represented by $h_1$, then the estimated channel for the UE will be $h_1$. When the UE moves from the point 706-1 to the point 712-1, the channel spatial correlation value between the UE and the point 706-1 drops from 710-1 to 710-2, meanwhile, the channel spatial correlation value between the UE and the point 706-2 increases from 0 to 710-2. If the UE continues to move along the left direction from the point 712-1, the correlation value between the UE and the point 706-2 will become larger than the correlation value between the UE and the point 706-1. In such a case, the estimated channel for the UE will change from $h_1$ to $h_2$, which corresponds to the channel gain vector at the point 706-2. In some embodiments, the distance between the points 712-1 and 706-1 is equal to a half of the distance between the points 706-2 and 706-1. Likewise, when the UE moves from the point 706-1 to the point 712-2, the channel spatial correlation value between the UE and the point 706-1 drops from 710-1 to 710-2, meanwhile, the channel spatial correlation value between the UE and the point 706-3 increases from 0 to 710-2. If the UE continues to move along the right direction from the point 712-2, the correlation value between the UE and the point 706-3 will become larger than the correlation value between the UE and the point 706-1. In such a case, the estimated channel for the UE will change from $h_1$ to $h_3$, which corresponds to the channel gain vector at the point 706-3. In some embodiments, the distance between the points 712-2 and 706-1 is equal to a half of the distance between the points 706-3 and 706-1.

Referring back to FIG. 5, in some embodiments, the area values of the virtual areas may change based on different channel conditions. For example, if a UE is located in a location $x_i$, wherein the channel between the location $x_i$ and the BS is an NLOS type of channel, as shown by the channels 508-1, 508-3 and 508-2, 508-4, then the area value of the virtual area that covers $x_i$ can be smaller than the area value of another virtual area that has a LOS type of channel with the BS. The reasoning is that for NLOS type of channels, the channel spatial correlation value between a UE within a virtual area and the geometric center of the virtual area can change more rapidly than the case with LOS type of channels. Therefore, to maintain an acceptable correlation level between the UE within a virtual area and the geometric center of the virtual area for NLOS type of channels, the area value of the virtual area should be smaller.

Referring back to FIG. 4, in some embodiments, communication between the BS 402 and the UEs 404 in the room 410-1 is performed with LOS type of channels, while communication between the BS 402 and the UEs 404 in the room 410-2 is performed with NLOS type of channels. Therefore, the virtual areas 412 in the room 410-1 have an area value larger than that of the virtual areas 412 in the room 410-2. As a result, the distance 414 between two adjacent virtual areas in the room 410-1 is larger than that between two adjacent virtual areas in the room 410-2. In some other embodiments, the area values of the virtual areas and the distance between two adjacent virtual areas are determined by a trial-and-error method.

Figure 9:
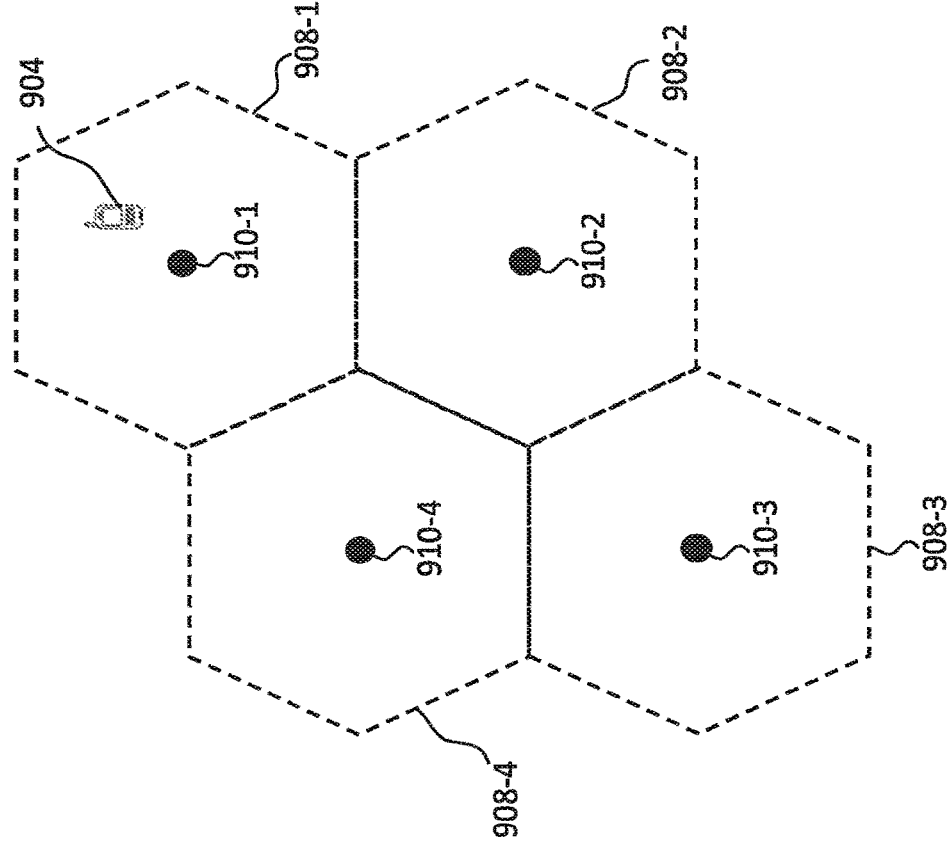
FIG. 9 illustrates an exemplary scenario of database generation, in accordance with some embodiments.
Figure 9:
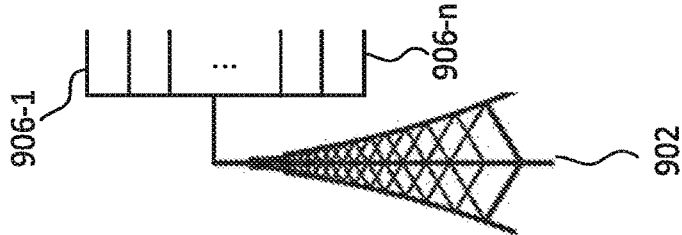

FIG. 9 illustrates an exemplary scenario of a database generation, in accordance with some embodiments. In some embodiments, a BS 902 communicates with a UE 904 through a plurality of antennas 906-1 to 906-n as shown. The BS 902 may comprise a database (e.g., a memory module 156) that stores locations 910-1, 910-2, 910-3 and 910-4 corresponding to the geometric centers of virtual areas 908-1, 908-2, 908-3 and 908-4, respectively. In one embodiment, the locations 910-1, 910-2, 910-3 and 910-4 are represented by a vector of locations $[x_1, x_2, x_3, x_4]$ stored in the database. Each location in the vector of locations $[x_1, x_2, x_3, x_4]$ may be represented by a longitudinal coordinate g and a lateral coordinate l: $[x_1(g_1, l_1), x_2(g_2, l_2), x_3(g_3, l_3), x_4(g_4, l_4)]$. The database may also include 4 channel gain vectors $[h_1, h_2, h_3, h_4]$ corresponding to the 4 vectors of locations, respectively. In some embodiments, the UE 904 is located at a location $x_k(g_k, l_k)$, wherein the nearest location from the stored locations in the database to $x_k(g_k, l_k)$ is $x_1(g_1, l_1)$. Therefore, the estimated channel for the UE 904 at location $x_k(g_k, l_k)$ will be $h_1$, and a corresponding precoder $w_1$ can be applied for compensating channel distortions for the UE 904.

In some embodiments, the UE 904 located at the location $x_k(g_k, l_k)$ receives a signal from the BS 902 with a signal strength denoted by $u_k$. Since the UE location $x_k(g_k, l_k)$ is different from the location $x_1(g_1, l_1)$ that is used to obtain the optimal channel estimate, due to errors in the UE channel estimation, the signal strength $u_k$ may be less than the signal strength $u_1$ that may have been received by the UE 904 if the UE 904 was at the location $x_1 (g_1, l_1)$. The difference between $u_k$ and $u_1$ may be expressed as: $\Delta u = u_1 - u_k$. In some embodiments, $\Delta u$ can be computed by the following expression:

$$\Delta u = \left| \frac{\sqrt{g_k^2 + l_k^2}}{\sqrt{g_1^2 + l_1^2}} - 1 \right|$$

In some embodiments, the BS 902 transmits signals to the UE 904 with a transmit power $P^{(g_1, l_1)}$ if the UE 904 is at the location $x_1(g_1, l_1)$, and the BS 902 transmits signals to the UE 904 with a transmit power $P^{(g_k, l_k)}$ if the UE 904 is at the location $x_k(g_k, l_k)$. Then using $\Delta u$ and a path loss exponent parameter $\alpha$, $P^{(g_k, l_k)}$ may be expressed as:

$$P^{(g_k, l_k)} = (1 + \Delta u)^\alpha \times P^{(g_1, l_1)}$$

In one embodiment, when the UE 904 is at a location $x_k(g_k, l_k)$ which is different from the geometric center $x_1(g_1, l_1)$ of the virtual area where the UE 904 is located, the estimated channel gain vector for UE 904 is $h_1$. Since the estimated channel gain vector $h_1$ for UE 904 is different from the actual channel gain vector $h_k$ of the UE 904, the BS 902 may need more transmit power to serve the UE 904. In some embodiments, the larger the difference between $x_k$ the $x_1$, the more transmit power the BS 902 needs to serve the UE 904.

In another embodiment, when the UE 904 is at a location $x_k(g_k, l_k)$ which is different from the geometric center $x_1(g_1, l_1)$ of the virtual area where the UE 904 is located, and the BS 902 communicates with the UE 904 in an LOS scenario, the channel gain vector $h_k$ associated with the location $x_k$ is highly correlated with the channel gain vector $h_1$ associated with the location $x_1$. The channel gain vector $h_k$ may be obtained by performing a rotational transformation: $h_k = R_{\theta_k}\{h_1\}$, where $R_{\theta_k}\{\bullet\}$ denotes a rotational transform operator such that each element of $h_1$ is scaled and then rotated by an angle of $\theta_k$, wherein $\theta_k$ denotes an angle between $x_k$ and $x_1$. In some embodiments, the angle $\theta_k$ is expressed by a dot product formula: $x_k \cdot x_1 = |x_k||x_1| \cos(\theta_k)$, therefore:

$$\theta_k = \cos^{-1} \frac{x_k \cdot x_1}{|x_k||x_1|}$$

In some embodiments, using the locations $x_k(g_k, l_k)$ and $x_1(g_1, l_1)$, the scaling factor needed for performing the scaling of $h_1$ in the rotational transformation is expressed as:

$$\sqrt{\frac{(g_k^2 + l_k^2)}{(g_1^2 + l_1^2)}}$$

In some embodiments, after performing the rotational transformation using $h_k = R_{\theta_k}\{h_1\}$, the BS 902 may apply a precoder $w_k$ for compensating channel distortions for the UE 904 based on the computed value of $h_k$ from the rotational transformation. For example, $h_1$ may be expressed as $$h_1 = \left[ h_1^{(1)}, h_2^{(1)}, \ldots, h_m^{(1)} \right]^T,$$

and $h_k$ may be expressed as $$h_k = \left[ h_1^{(k)}, h_2^{(k)}, \ldots, h_m^{(k)} \right]^T,$$

then the i-th element of $h_1$ can be expressed as:

$$h_i^{(1)} = \alpha e^{-j\beta\sqrt{(g_1^2 + l_1^2)}} e^{-j2\pi(i-1)\Delta\cos(\varphi)}, 1 \le i \le m$$

After the scaling and angle rotation, the corresponding i-th element of $h_k$ may be obtained by:

$$h_i^{(k)} = \alpha e^{-j\beta\sqrt{(g_k^2 + l_k^2)}} e^{-j2\pi(i-1)\Delta\cos(\varphi+\theta_k)}, 1 \le i \le m$$

In some embodiments, the channel spatial correlation between the channel gain vector $h_k$ of the UE 904 and the channel gain vector $h_1$ of the geometric center 910-1 in the virtual area 908-1 is not only dependent on the distance between $x_k$ and $x_1$, but also on the mobility of the UE 904. The BS 902 may communicate with the UE 904 under a radio resource control (RRC) protocol. In one embodiment, the RRC protocol comprises three states: RRC_IDLE, RRC_CONNECTED, and RRC_INACTIVE. The BS 902 may estimate the mobility of the UE 904 in the RRC_CONNECTED state based on the number of handovers.

In some embodiments, the BS 902 comprises a database comprising a plurality of locations (for example, M locations $\{x_1, \ldots, x_M\}$), wherein each of the plurality of locations is associated with a corresponding plurality of channel estimates, wherein each of the corresponding plurality of channel estimates is estimated based on a different UE mobility value. For example, the i-th element $x_i$ of $\{x_1, \ldots, x_M\}$ may be associated with 4 channel estimates $h_{i1}$, $h_{i2}$, $h_{i3}$, and $h_{i4}$, wherein $h_{i1}$, $h_{i2}$, $h_{i3}$, and $h_{i4}$ are the channel estimates obtained based on UE mobility values $m_1$, $m_2$, $m_3$, and $m_4$, respectively, wherein $m_1 < m_2 < m_3 < m_4$. In some embodiments, a UE has an actual mobility value of $m_1$ and $x_i$ has the closest distance to the UE, then the channel estimate for the UE is $h_{i1}$, which will be used for compensating distortions during transmission.

Additionally, in some embodiments, depending on the actual mobility value of the UE, the frequency of tracking and adjusting the location of the UE 904 is changed. For example, for higher mobility values, the location of the UE and its corresponding channel estimates are updated more frequently (i.e., the period between updates is reduced). In some embodiments, the BS 902 knows the heading and speed of the UE 904 based on known tracking techniques (e.g., GPS). Based on the heading and speed of the UE 904, the BS 902 can determine when a new set of channel estimates should be used based on the anticipated arrival of the UE 904 at the new location. In this way, the BS 902 can dynamically adjust the frequency of updating the location of the UE and corresponding channel estimates. In further embodiments, a higher actual mobility of the UE 904 will result in a channel estimate requiring more robust transmission parameters (e.g., wider beam pattern, greater redundancy, increase in allocation of resources, etc.). In particular, the BS 902 may apply different sets of channel estimates to two UEs in the same location, depending on their speed and heading, whereby the UE with the higher mobility state would require channel estimate with more robust transmission parameters.

In some embodiments, the BS 902 receives UE heading information from the UE 904 and predicts a future position of the UE 904 based on the UE heading information. Then based on the predicted future position of the UE 904, the BS 902 may apply the rotational transformation to estimate the channel for the future position of the UE 904. For example, given a current position $x_k$ and a current channel gain vector $h_k$ of the UE 904, the BS 902 may estimate a future position $x_{k+1}$ of the UE 904 based on the received UE heading information. Then the BS 902 may perform a rotational transformation to estimate the future channel gain vector $h_{k+1}$ corresponding to $x_{k+1}$ using $h_{k+1} = R_{\theta_{k+1}}\{h_k\}$, where $R_{\theta_{k+1}}\{\bullet\}$ denotes a rotational transform operator such that each element of $h_k$ is scaled and then rotated by an angle of $\theta_{k+1}$, wherein $\theta_{k+1}$ denotes the angle between $x_k$ and $x_{k+1}$.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed, instructed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first wireless communication node, the method comprising:

accessing a database storing a first plurality of locations, a first plurality of channels associated with respective ones of the first plurality of locations, and a first plurality of channel estimates associated with respective ones of the first plurality of channels;

obtaining a second location of a first wireless communication device;

determining a closest location from among the first plurality locations that has a closest distance to the second location;

selecting a channel estimate from among the first plurality of channel estimates that corresponds to the closest location;

determining a second channel estimate for the first wireless communication device based on the selected channel estimate; and adjusting at least one parameter of a signal transmitted between the first wireless communication node and the first wireless communication device based on the second channel estimate.

2. The method of claim 1, wherein the second channel estimate is set to be equal to the selected channel estimate when the closest distance is less than or equal to a predetermined distance threshold.

3. The method of claim 2, further comprising updating the database by adding the second location to the first plurality of locations and the second channel estimate to the first plurality of channel estimates when the closest distance is larger than the predetermined distance threshold.

4. The method of claim 3, further comprising:

sending a channel estimation request for the first wireless communication device when the closest distance is larger than the predetermined distance threshold;

receiving a sounding reference signal (SRS) from the first wireless communication device in response to the channel estimation request, wherein the second channel estimate is determined based on the received SRS, and updating the database by adding the second channel estimate to the first plurality of channel estimates in the database.

5. The method of claim 2, wherein the predetermined distance threshold is determined based on a communication type between the first wireless communication node and the first wireless communication device, wherein the communication type is a line-of-sight (LOS) type or a non-line-of-sight (NLOS) type, wherein the predetermined distance threshold determined when the communication type is the LOS type is larger than the predetermined distance threshold determined when the communication type is the NLOS type.

6. The method of claim 1, wherein each of the first plurality of channel estimates is associated with a plurality of predetermined mobility values, wherein each predetermined mobility value represents a rate of movement of the first wireless communication device, the method further comprising:

determining an actual rate of movement of the first wireless communication device; selecting one of the predetermined mobility values based on the actual rate of movement, wherein the selection of the selected channel estimate is further based on the selected mobility value.

7. The method of claim 1, wherein each of the first plurality of channel estimates comprises a respective one of a first plurality of channel parameter vectors and the second channel estimate comprises a second channel parameter vector.

8. The method of claim 7, wherein the second channel parameter vector is estimated using a position-to-channel mapping function, wherein the position-to-channel mapping function is learned from the first plurality of locations and the first plurality of channel parameter vectors, wherein the position-to-channel mapping function is an artificial neural network model.

9. A method performed by a first wireless communication node, the method comprising:

accessing a database storing a first plurality of locations, a first plurality of channel associated with the first plurality of locations, respectively, and a first plurality of channel estimates associated with the first plurality of channels, respectively, wherein each of the first plurality of channel estimates is associated with a plurality of predetermined mobility values, wherein each predetermined mobility value represents a rate of movement of the first wireless communication device;

obtaining a second location of the first wireless communication device;

determining a closest location from among the first plurality locations that has a closest distance to the second location;

determining an actual rate of movement of the first wireless communication device;

selecting one of the predetermined mobility values based on the actual rate of movement;

selecting a channel estimate from among the first plurality of channel estimates that corresponds to the closest location and the selected predetermined mobility value;

determining a second channel estimate for the first wireless communication device based on the selected channel estimate; and adjusting at least one parameter of a signal transmitted between the first wireless communication node and the first wireless communication device based on the second channel estimate.

10. The method of claim 9, wherein the second channel estimate is the same as the selected channel estimate when the closest distance is less than or equal to a predetermined distance threshold.

11. The method of claim 10, further comprising updating the database by adding the second location to the first plurality of locations when the closest distance is larger than the predetermined distance threshold.

12. The method of claim 11, further comprising:

sending a channel estimation request for the first wireless communication device when the closest distance is larger than the predetermined distance threshold, receiving a sounding reference signal (SRS) from the first wireless communication device in response to the channel estimation request, determining the second channel estimate for the first wireless communication device based on the received SRS, and updating the database by adding the second channel estimate to the database.

13. The method of claim 10, wherein the predetermined distance threshold is determined based on a communication type between the first wireless communication node and the first wireless communication device, wherein the communication type is a line-of-sight (LOS) type or a non-line-of-sight (NLOS) type, wherein the predetermined distance threshold determined when the communication type is the LOS type is larger than the predetermined distance threshold determined when the communication type is the NLOS type.

14. The method of claim 9, wherein the second channel estimate is determined using a position-to-channel mapping function, wherein the position-to-channel mapping function is learned from the first plurality of locations and each of the corresponding first plurality of channel estimates, wherein the position-to-channel mapping function is an artificial neural network model.

15. A wireless communication node comprising:

at least one processor configured to access a database storing a first plurality of locations, a first plurality of channels associated with respective ones of the first plurality of locations, and a first plurality of channel estimates associated with respective ones of the first plurality of channels; and a transceiver coupled to the at least one processor and configured to periodically obtain a signal indicating a second location of a first wireless communication device, wherein the at least one processor is further configured to:

determine a closest location from among the first plurality locations that has a closest distance to the second location;

select a channel estimate from among the first plurality of channel estimates that corresponds to the closest location;

determine a second channel estimate for the first wireless communication device based on the selected channel estimate; and adjust at least one parameter of a signal transmitted between the first wireless communication node and the first wireless communication device based on the second channel estimate.

16. The wireless communication node of claim 15, wherein each of the first plurality of channel estimates is associated with a plurality of predetermined mobility values, wherein each predetermined mobility value represents a rate of movement of the first wireless communication device, and wherein the at least one processor is further configured to:

determine an actual rate of movement of the first wireless communication device; and select one of the predetermined mobility values based on the actual rate of movement, wherein the selection of the selected channel estimate is further based on the selected mobility value.

17. The wireless communication node of claim 15, wherein the second channel estimate is set equal to the selected channel estimate when the closest distance is less than or equal to a predetermined distance threshold.

18. The wireless communication node of claim 17, wherein the predetermined distance threshold is determined based on a communication type between the first wireless communication node and the first wireless communication device, wherein the communication type is a line-of-sight (LOS) type or a non-line-of-sight (NLOS) type, wherein the predetermined distance threshold determined when the communication type is the LOS type is larger than the predetermined distance threshold determined when the communication type is the NLOS type.

19. The wireless communication node of claim 15, wherein the at least one processor is further configure to update the database by adding the second location to the first plurality of locations when the closest distance is larger than the predetermined distance threshold.

20. The wireless communication node of claim 19, wherein:

the transceiver is further configure to:

transmit a channel estimation request to the first wireless communication device when the closest distance is larger than the predetermined distance threshold, receive a sounding reference signal (SRS) from the first wireless communication device in response to the channel estimation request, and the at least one processor is further configure to:

determine the second channel estimate for the first wireless communication device based on the received SRS, and update the database by adding the second channel estimate to the first plurality of channel estimates in the database.

21. The wireless communication node of claim 15, wherein each of the first plurality of channel estimates comprises a respective one of a first plurality of channel parameter vectors and the second channel estimate comprises a second channel parameter vector.

* * * * *